US012565197B2

(12) United States Patent
    Ishikawa

(10) Patent No.: US 12,565,197 B2
(45) Date of Patent: Mar. 3, 2026

(54) PARKING ASSISTANCE DEVICE

(71) Applicant: AISIN CORPORATION, Kariya (JP)

(72) Inventor: Kota Ishikawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 23 days.

(21) Appl. No.: 18/607,860

(22) Filed: Mar. 18, 2024

(65) Prior Publication Data

US 2024/0326783 A1 Oct. 3, 2024

(30) Foreign Application Priority Data

Mar. 31, 2023 (JP) .................................. 2023-058768

(51) Int. Cl.
    *B60W 30/06* (2006.01)
    *B60W 50/00* (2006.01)

(52) U.S. Cl.
    CPC ............ *B60W 30/06* (2013.01); *B60W 50/00* (2013.01); *B60W 2050/001* (2013.01); *B60W 2520/105* (2013.01)

(58) Field of Classification Search
    CPC ................. B60W 30/06; B60W 50/00; B60W 2050/001; B60W 2520/105; B60W 10/04; B60W 10/18; B60W 40/105; B60W 40/107; B60W 2710/06; B60W 2710/18; B62D 15/027; B62D 15/0285
    See application file for complete search history.

(56) References Cited

U.S. PATENT DOCUMENTS

2020/0031336 A1* 1/2020 Akatsuka .............. B60W 10/04

FOREIGN PATENT DOCUMENTS

JP          5660851 B2      1/2015

* cited by examiner

*Primary Examiner* — Daryl C Pope
(74) *Attorney, Agent, or Firm* — Sughrue Mion, PLLC

(57) ABSTRACT

A parking assistance device includes: a target acceleration calculation unit that calculates a target acceleration for moving a vehicle subjected to assistance to a target parking position of the vehicle subjected to assistance; an acceleration feedback control unit that calculates a required braking and driving force based on a deviation between the target acceleration of the vehicle subjected to assistance and an actual acceleration by feedback control including an integration term, determines whether the vehicle subjected to assistance has gone over a step, and resets an integrated value of the deviation between the target acceleration and the actual acceleration to 0 when it is determined that the vehicle subjected to assistance has gone over the step; and a vehicle control unit that controls the braking and driving force of the vehicle subjected to assistance based on the required braking and driving force.

3 Claims, 9 Drawing Sheets

*FIG. 2*

PARKING ASSISTANCE DEVICE

CROSS REFERENCE TO RELATED APPLICATIONS

This application is based on and claims priority under 35 U.S.C. § 119 to Japanese Patent Application No. 2023-058768, filed on Mar. 31, 2023, the entire content of which is incorporated herein by reference.

TECHNICAL FIELD

Embodiments of the present disclosure relate to a parking assistance device.

BACKGROUND DISCUSSION

Conventionally, parking assistance devices for vehicles (such as passenger cars) have been researched and developed and used. For example, a parking assistance device disclosed in JP 5660851 B2 assists parking by performing braking and driving force (braking force and driving force) control and steering control by an electronic control unit (ECU). In the braking and driving force control, for example, feedback (FB) control is used.

Specifically, for example, first, target speed is calculated based on deviation between a parking target position and an actual position of a vehicle subjected to assistance. Next, a target acceleration is calculated based on the deviation between the target speed and an actual speed. Next, a required braking and driving force is calculated based on deviation between the target acceleration and an actual acceleration. Then, braking and driving force of the vehicle subjected to assistance is controlled based on the required braking and driving force.

In addition, in a case where proportional-integral (PI) control or proportional-integral-differential (PID) control is used as the FB control, I control for integrating deviation is performed. For example, when a required braking and driving force is calculated by PI control based on deviation between target acceleration and actual acceleration (hereinafter, also referred to as "the deviation"), inclusion of the I control can reduce an effect caused by a disturbance element (road surface environment, step difference, or the like).

However, in the prior art described above, for example, when a vehicle goes over a step, an integrated value of the deviation has increased immediately before the vehicle goes over the step. Therefore, if the vehicle goes over the step in that state, torque rapidly decreases, so that there is a problem that a required driving force increases due to a large integrated value and the ride comfort of the vehicle deteriorates.

A need thus exists for a parking assistance device which is not susceptible to the drawback mentioned above.

SUMMARY

A parking assistance device includes: a target acceleration calculation unit that calculates a target acceleration for moving a vehicle subjected to assistance to a target parking position of the vehicle subjected to assistance; an acceleration feedback control unit that calculates a required braking and driving force based on a deviation between the target acceleration of the vehicle subjected to assistance and an actual acceleration by feedback control including an integration term, determines whether the vehicle subjected to assistance has gone over a step, and resets an integrated value of the deviation between the target acceleration and the actual acceleration to 0 when it is determined that the vehicle subjected to assistance has gone over the step; and a vehicle control unit that controls the braking and driving force of the vehicle subjected to assistance based on the required braking and driving force.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a plan view (overhead view) of the vehicle according to the embodiment;

DETAILED DESCRIPTION

Hereinafter, an exemplary embodiment of the present disclosure is disclosed. A configuration of the embodiment shown below, and actions, results, and effects brought by the configuration are examples. The present disclosure can be achieved by configurations other than that disclosed in the following embodiment, and at least one of various effects based on a basic configuration or derivative effects can be obtained.

A vehicle 1 of the present embodiment may be, for example, an automobile using an internal combustion engine which is not illustrated, as a drive source, that is, an internal combustion engine automobile, may be an automobile using an electric motor which is not illustrated as a drive source, that is, an electric automobile or a fuel cell automobile, or the like, may be a hybrid automobile using both of them as drive sources, or may be an automobile including another drive source. In addition, the vehicle 1 can be equipped with various transmission devices, and can be equipped with various devices necessary for driving the internal combustion engine and the electric motor, for example, systems, components, and the like. In addition, a type, the number, layout, and the like of a device related to driving of a wheel 3 in the vehicle 1 can be variously set.

Figure 1:
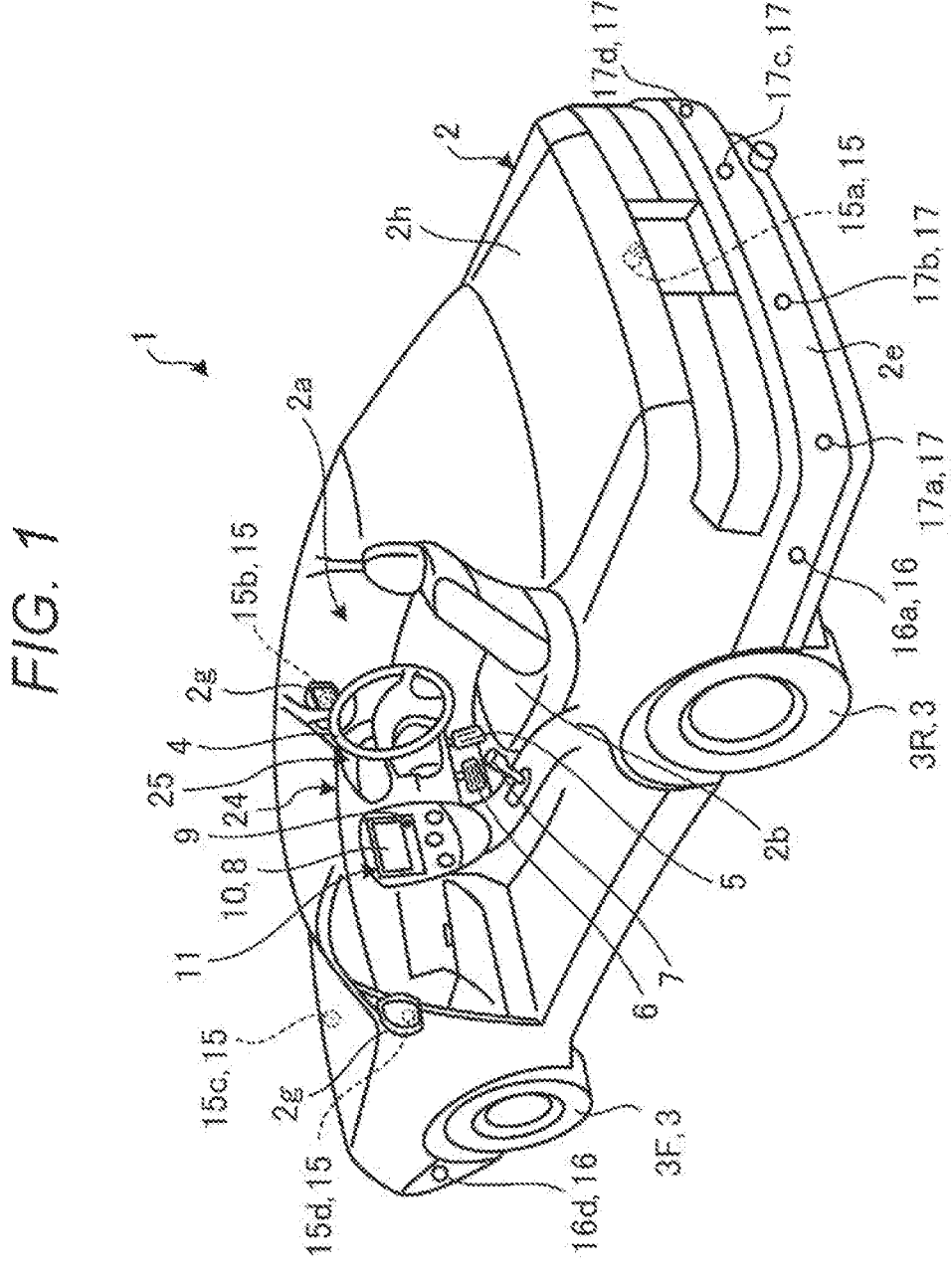
FIG. 1 is an external perspective view of a vehicle when a part of a vehicle interior is seen through in an embodiment.

FIG. 1 is an external perspective view of a vehicle 1 when a part of a vehicle interior is seen through in an embodiment.

Figure 2:
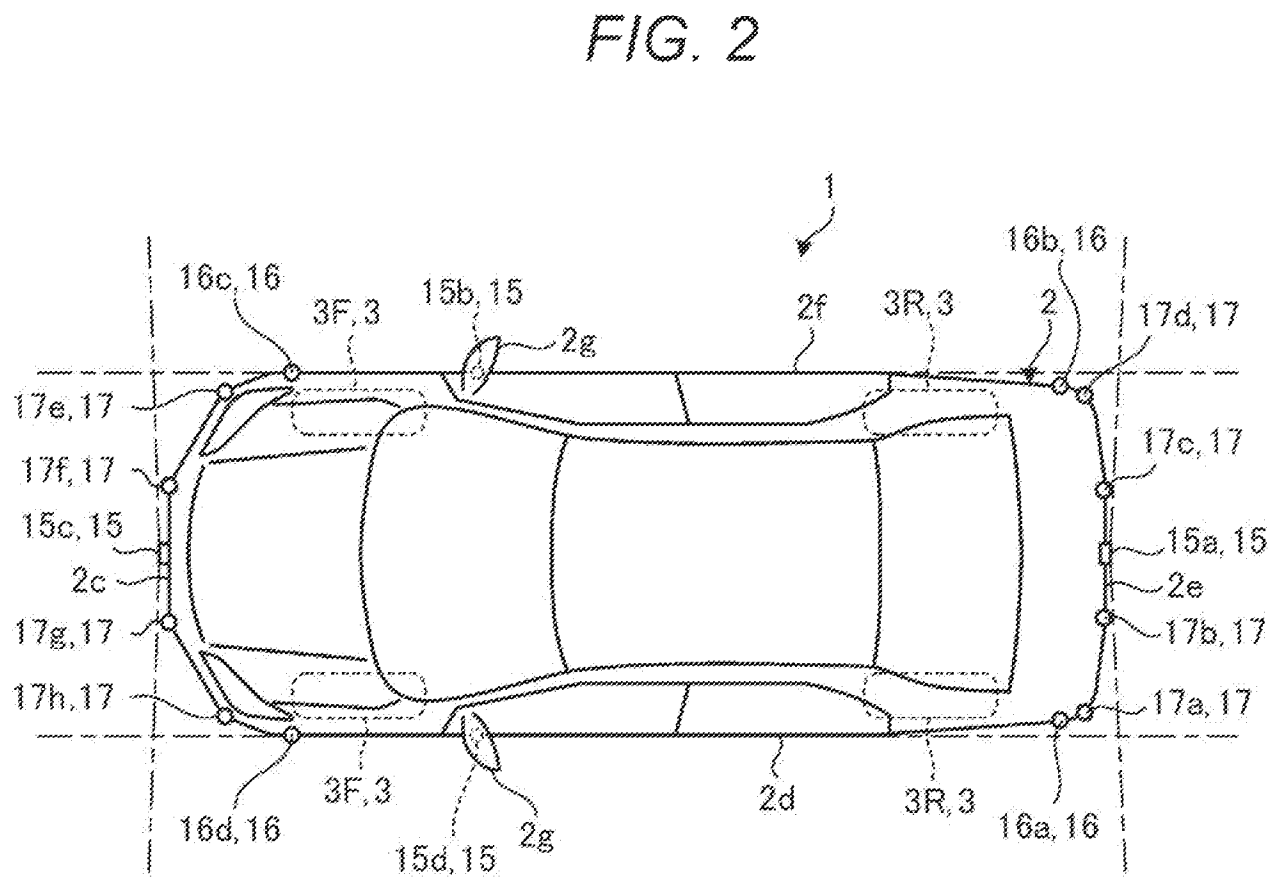

FIG. 2 is a plan view (overhead view) of the vehicle 1 according to the embodiment. As illustrated in FIG. 1, a vehicle body 2 includes a vehicle interior 2a in which an occupant which is not illustrated rides. In the vehicle interior 2a, a steering unit 4, an acceleration operation unit 5, a braking operation unit 6, a shift operation unit 7, and the like are provided in a state of facing a seat 2b of a driver as an occupant.

The steering unit 4 is, for example, a steering wheel protruding from a dashboard 24. The acceleration operation unit 5 is, for example, an accelerator pedal positioned at a foot of the driver. The braking operation unit 6 is, for example, a braking pedal positioned ata foot of the driver. The shift operation unit 7 is, for example, a shift lever protruding from a center console. Note that these configurations are not limited to those described above.

In the vehicle interior 2a, a display device 8 as a display output part and a sound output device 9 as a sound output part are provided. The display device 8 is, for example, a liquid crystal display (LCD), an organic electroluminescent display (OELD), or the like. The sound output device 9 is, for example, a speaker. In addition, the display device 8 is covered with an operation input part 10 that is transparent, such as a touch panel or the like. The occupant can visually recognize an image displayed on a display screen of the display device 8 via the operation input part 10.

In addition, the occupant can perform an operation input by touching, pushing, or moving the operation input part 10 with a finger or the like at a position corresponding to an image displayed on the display screen of the display device 8. The display device 8, the sound output device 9, the operation input part 10, and the like are provided, for example, in a monitor device 11 located at a center of the dashboard 24 in a vehicle width direction, that is, a left-right direction.

The monitor device 11 can have an operation input part which is not illustrated such as a switch, a dial, a joystick, or a push button. In addition, a sound output device which is not illustrated can be provided at another position in the vehicle interior 2a, the sound output device being different from the sound output device of the monitor device 11, and sound can be output from the sound output device 9 of the monitor device 11 and the other sound output device. Note that the monitor device 11 can also be used as, for example, a navigation system or an audio system. In the vehicle interior 2a, a display device 12 (see FIG. 3) which is different from the display device 8 is provided.

Figure 3:
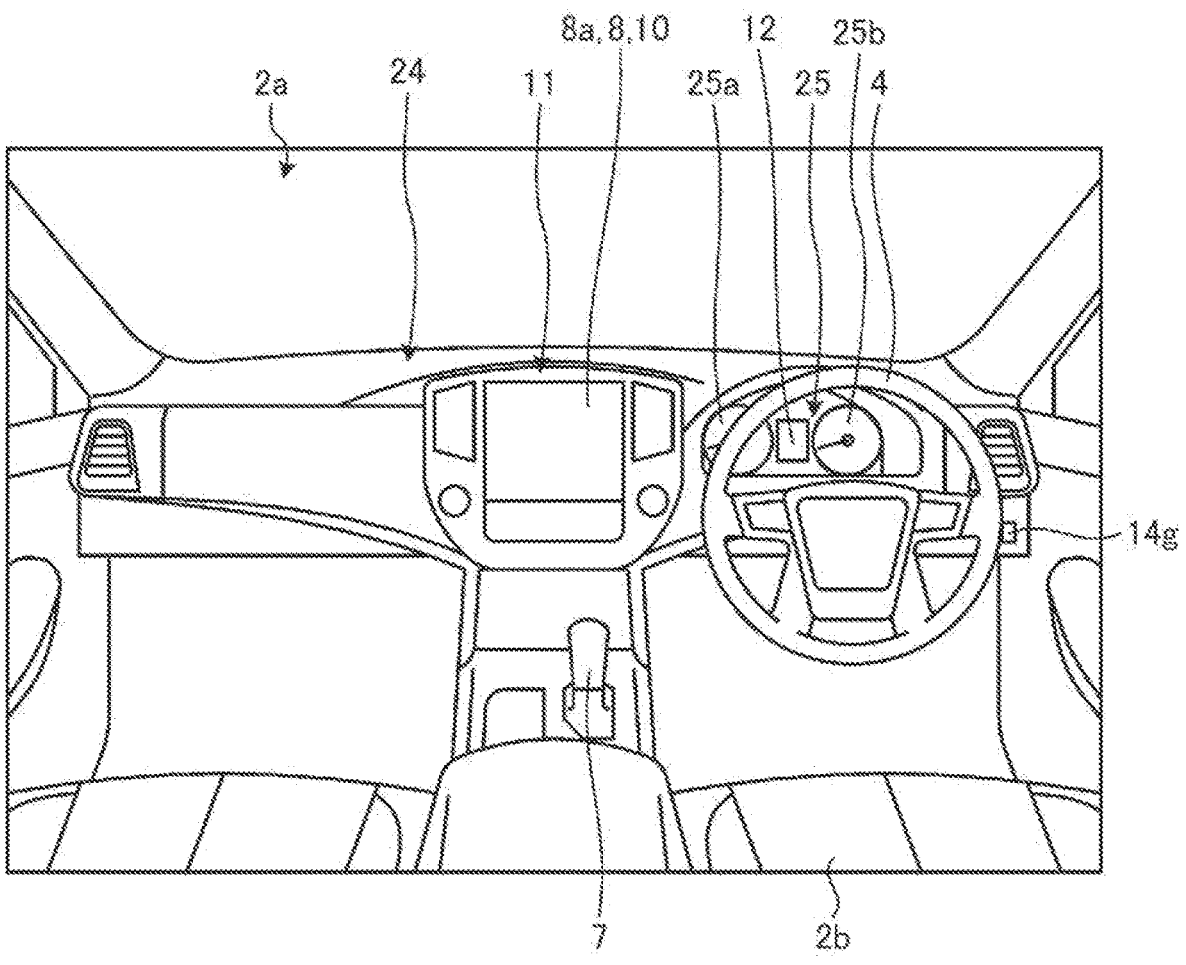
FIG. 3 is a configuration diagram of a dashboard of the vehicle when viewed from a rear of the vehicle in the embodiment.

FIG. 3 is a configuration diagram of a dashboard of the vehicle 1 when viewed from a rear of the vehicle in the embodiment; As exemplified in FIG. 3, the display device 12 is provided, for example, on a dashboard panel 25 of the dashboard 24, and is located between a speed indicator 25a and a rotation speed indicator 25b substantially at a center of the dashboard panel 25. A size of a screen of the display device 12 is smaller than a size of a screen of the display device 8 (FIG. 1). The display device 12 can mainly display an image indicating information related to parking assistance of the vehicle 1.

As illustrated in FIGS. 1 and 2, the vehicle 1 is, for example, a four-wheeled automobile, and has two left and right front wheels 3F and two left and right rear wheels 3R. All of these four wheels 3 can be configured to be steerable.

Figure 4:
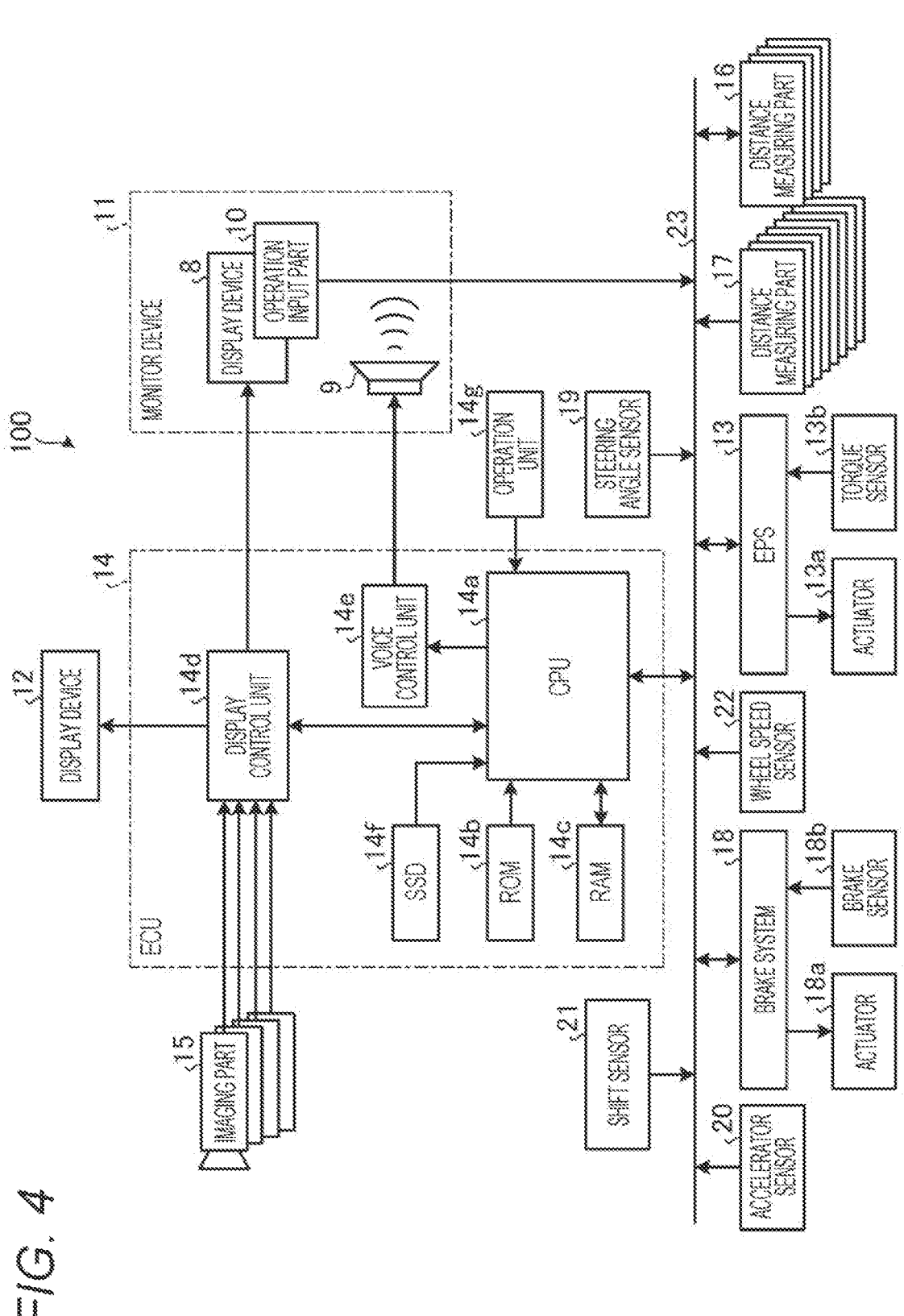
FIG. 4 is a block diagram illustrating a functional configuration of a parking assistance system according to the embodiment.

FIG. 4 is a block diagram illustrating a functional configuration of a parking assistance system according to the embodiment. As illustrated in FIG. 4, the vehicle 1 has an electric power steering system (EPS) 13 that steers at least two wheels 3. The EPS 13 includes an actuator 13a and a torque sensor 13b. The EPS 13 is electrically controlled by an electronic control unit (ECU) 14 or the like to operate the actuator 13a. In the following description, the EPS 13 is an electric power steering system, a steer by wire (SBW) system, or the like. The EPS 13 applies torque, that is, assist torque, to the steering unit 4 by the actuator 13a to supplement steering force, and steers the wheel 3 by the actuator 13a. In this case, the actuator 13a may steer one wheel 3 or may steer a plurality of the wheels 3. In addition, the torque sensor 13b detects, for example, a torque applied to the steering unit 4 by the driver.

As illustrated in FIG. 2, the vehicle body 2 is provided with, for example, four imaging parts 15a to 15d as a plurality of imaging parts 15.

Furthermore, the ECU 14 identifies, from the image of the imaging part 15, a section line or the like indicated on a road surface around the vehicle 1, and detects (extracts) a parking lot indicated by the section line or the like.

As illustrated in FIGS. 1 and 2, the vehicle body 2 is provided with, for example, four distance measuring parts 16a to 16d and eight distance measuring parts 17a to 17h as a plurality of distance measuring parts 16 and 17. The distance measuring parts 16 and 17 are sonars that emit ultrasonic waves and capture reflected waves thereof, for example.

As illustrated in FIG. 4, in a parking assistance system 100, a brake system 18, a steering angle sensor 19, an accelerator sensor 20, a shift sensor 21, a wheel speed sensor 22, and the like are further electrically connected via an in-vehicle network 23 as an electric communication line.

The in-vehicle network 23 is configured as, for example, a controller area network (CAN). The ECU 14 can control the EPS 13, the brake system 18, and the like by sending a control signal through the in-vehicle network 23. Furthermore, the ECU 14 can receive detection results of the torque sensor 13b, the brake sensor 18b, the steering angle sensor 19, the distance measuring part 16, the distance measuring part 17, the accelerator sensor 20, the shift sensor 21, the wheel speed sensor 22, and the like, operation signals of the operation input part 10 and the like via the in-vehicle network 23.

As illustrated in FIG. 4, the ECU 14 has, for example, a central processing unit (CPU) 14a, a read only memory (ROM) 14b, a random access memory (RAM) 14c, a display control unit 14d, a voice control unit 14e, a solid state drive or flash memory (SSD) 14f, and the like.

For example, the CPU 14a can execute various types of arithmetic processing and control such as image processing related to images displayed on the display devices 8 and 12, determination of a target position (parking target position) of the vehicle 1, calculation of a movement route of the vehicle 1, determination of presence or absence of interference with an object, automatic control of the vehicle 1, and cancellation of the automatic control. The CPU 14a can read a program installed and stored in a nonvolatile storage device such as the ROM 14b and execute arithmetic processing according to the program.

The RAM 14c temporarily stores various data used in the calculation in the CPU 14a. In addition, the display control unit 14d mainly executes image processing using image data obtained by the imaging part 15, combination of image data displayed on the display devices 8 and 12, and the like among the arithmetic processing in the ECU 14. In addition, the voice control unit 14e mainly executes processing of voice data output by the sound output device 9 in the arithmetic processing in the ECU 14. The SSD 14f is a rewritable nonvolatile storage unit, and can store data even when a power supply of the ECU 14 is turned off.

Note that the CPU 14a, the ROM 14b, the RAM 14c, and the like can be integrated in the same package. Furthermore, the ECU 14 may have a configuration in which another logical operation processor such as a digital signal processor (DSP), or a logic circuit, or the like is used instead of the CPU 14*a*. In addition, a hard disk drive (HDD) may be provided instead of the SSD 14*f*, and the SSD 14*f* and the HDD may be provided separately from the ECU 14.

The brake system 18 is, for example, an anti-lock brake system (ABS) that suppresses locking of a brake, an electronic stability control (ESC) that suppresses skidding of the vehicle 1 at the time of cornering, an electric brake system that enhances braking force (executes brake assist), a brake by wire (BBW), or the like. The brake system 18 applies a braking force to the wheel 3 and thus the vehicle 1 via the actuator 18*a*.

In addition, the brake system 18 can execute various controls by detecting a lock of the brake, idle rotation of the wheel 3, a sign of skidding, or the like from a rotation difference between the left and right wheels 3, or the like. The brake sensor 18*b* is, for example, a sensor that detects a position of a movable portion of the braking operation unit 6. The brake sensor 18*b* can detect a position of a brake pedal as a movable portion of the braking operation unit 6. The brake sensor 18*b* includes a displacement sensor.

The steering angle sensor 19 is, for example, a sensor that detects a steering amount of the steering unit 4 such as a steering wheel. The steering angle sensor 19 is configured using, for example, a Hall element or the like. The ECU 14 acquires a steering amount of the steering unit 4 by the driver, a steering amount of each wheel 3 at the time of automatic steering, and the like from the steering angle sensor 19 and executes various controls. Note that the steering angle sensor 19 detects a rotation angle of a rotating part included in the steering unit 4. The steering angle sensor 19 is an example of an angle sensor.

The accelerator sensor 20 is, for example, a sensor that detects a position of a movable portion of the acceleration operation unit 5. The accelerator sensor 20 can detect a position of the accelerator pedal as a movable portion of the acceleration operation unit 5. The accelerator sensor 20 includes a displacement sensor.

The shift sensor 21 is, for example, a sensor that detects a position of a movable portion of the shift operation unit 7.

The shift sensor 21 can detect positions of a lever, an arm, a button, and the like as movable portions of the shift operation unit 7. The shift sensor 21 may include a displacement sensor or may be configured as a switch.

The wheel speed sensor 22 is a sensor that detects a rotation amount or a rotation speed per unit time of the wheel 3. The wheel speed sensor 22 outputs the number of wheel speed pulses indicating the detected rotation speed as a sensor value. The wheel speed sensor 22 can be configured using, for example, a Hall element or the like. The ECU 14 calculates a movement amount and the like of the vehicle 1 based on the sensor value acquired from the wheel speed sensor 22 and executes various controls. Note that the wheel speed sensor 22 may be provided in the brake system 18. In this case, the ECU 14 acquires a detection result of the wheel speed sensor 22 via the brake system 18.

Note that the configurations, arrangements, electrical connection forms, and the like of the various sensors and actuators described above are examples, and can be variously set (changed).

In the present embodiment, the ECU 14 achieves at least a part of the function as the parking assistance device by cooperation of hardware and software (control program).

Figure 5:
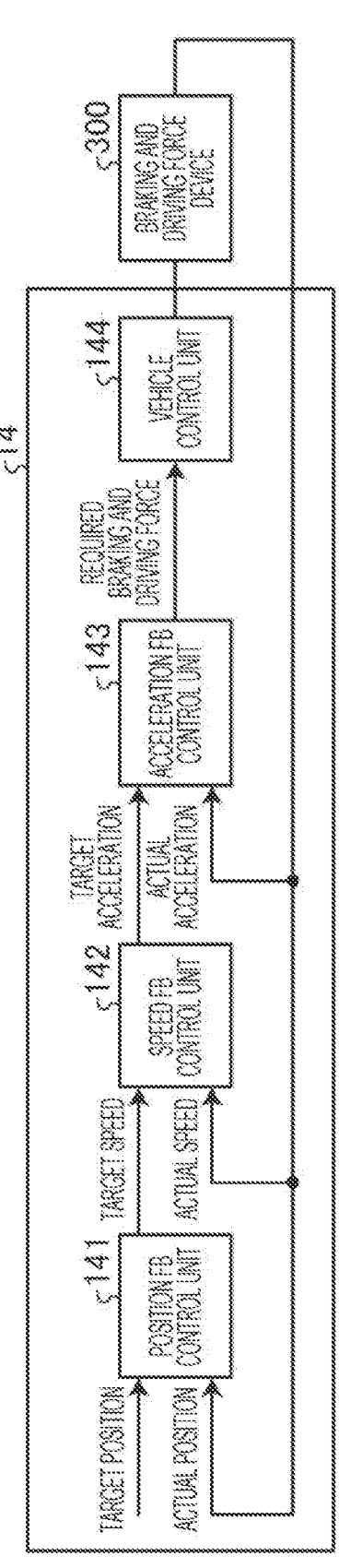
FIG. 5 is a block diagram illustrating a functional configuration of the ECU of the embodiment.

FIG. 5 is a block diagram illustrating a functional configuration of the ECU 14 of the embodiment. The ECU 14 includes, as a functional configuration, a position feedback (FB) control unit 141, a speed FB control unit 142, an acceleration FB control unit 143, and a vehicle control unit 144. The position FB control unit 141, the speed FB control unit 142, and the acceleration FB control unit 143 execute, for example, proportional-integral (PI) control as feedback (FB) control, but are not limited thereto, and may execute proportional-integral-differential (PID) control.

The position FB control unit 141 calculates, based on deviation between a target parking position and an actual position of the vehicle 1, a target speed.

The speed FB control unit 142 calculates, based on deviation between a target speed and an actual speed of the vehicle 1, a target acceleration.

Note that the functions of the position FB control unit 141 and the speed FB control unit 142 may be combined to form a target acceleration calculation unit. For example, the target acceleration calculation unit calculates a target acceleration for moving the vehicle 1 to a target parking position of the vehicle 1. In this case, the target acceleration calculation unit in the claims corresponds to the position FB control unit 141 and the speed FB control unit 142 in the embodiment.

The acceleration FB control unit 143 calculates the required braking and driving force based on the deviation between the target acceleration and the actual acceleration of the vehicle 1 by the FB control including an integration term, and determines whether the vehicle 1 has gone over the step. When determining that the vehicle 1 has gone over the step, the acceleration FB control unit 143 resets an integrated value of the deviation between the target acceleration and the actual acceleration (hereinafter, also simply referred to as an "integrated value") to 0.

Hereinafter, description will be given also with reference to FIGS. 6 to 8. FIGS. 6A to 6C are explanatory diagrams regarding determination of whether the vehicle 1 has gone over a step in the embodiment; In FIGS. 6A to 6C, the time advances as it goes downward.

First, the wheel 3 of the vehicle 1 advances toward a step 90 and comes into contact with the step 90. The vehicle 1 receives a force on an opposite side (left side in the drawing) to a traveling direction by the contact between the wheel 3 and the step 90, and temporarily stops (FIG. 6A TIME ta1). Next, as the vehicle 1 increases the driving force, the wheels 3 travel obliquely upward and start climbing the step 90 (FIG. 6B TIME ta2). Next, the wheel 3 goes over the step 90 (FIG. 6C TIME ta3).

Note that the word "stops" described above does not mean only complete stop, but also includes a state close to stop (for example, a vehicle speed is equal to or less than a predetermined threshold).

Figures 7A, 7B:
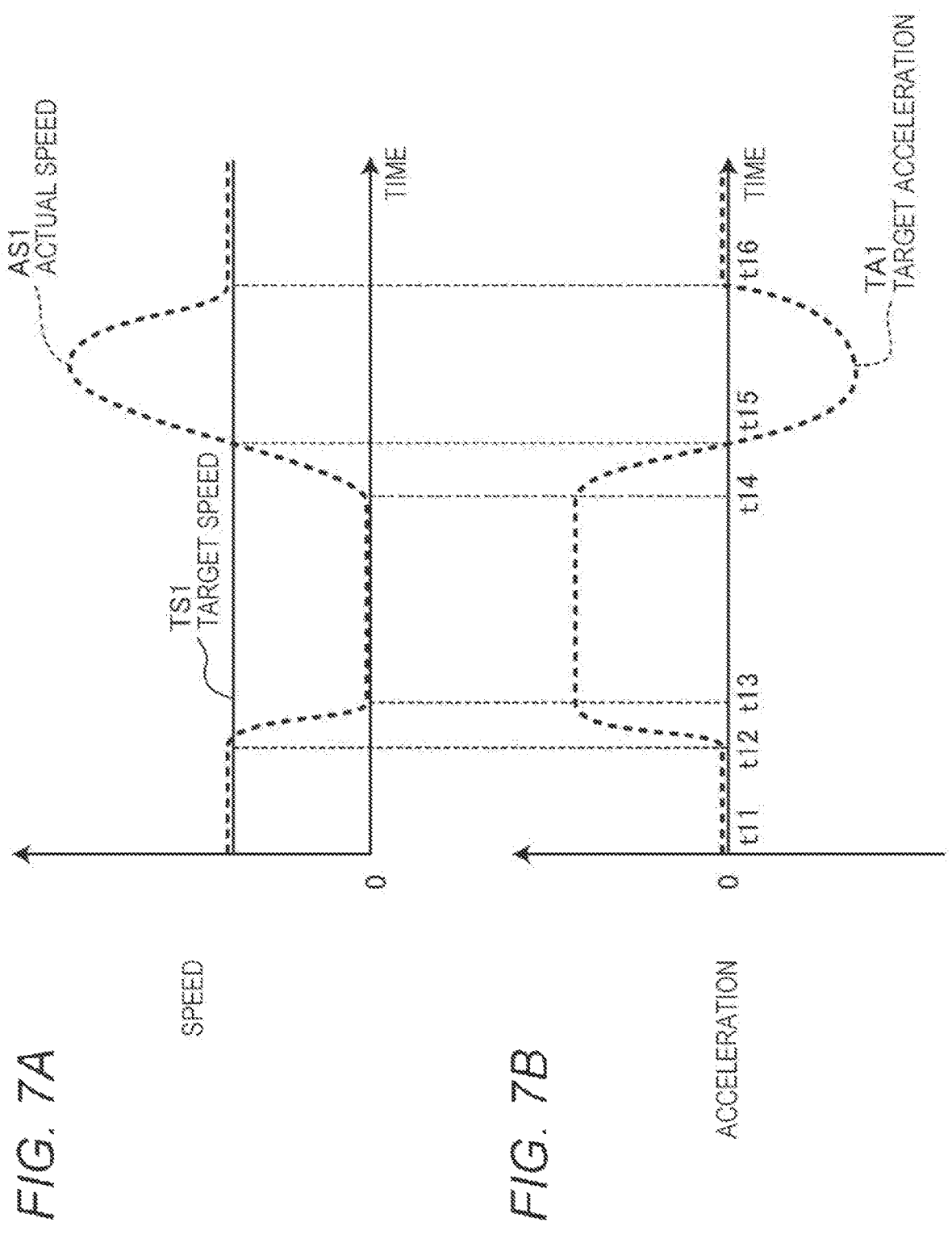
FIGS. 7A and 7B are graphs each illustrating an example of a temporal change of each parameter in the prior art.

FIGS. 7A and 7B are graphs each illustrating an example of a temporal change of each parameter in the prior art. FIG. 7A is a graph of speed, and FIG. 7B is a graph of acceleration. In the parking assistance in the prior art, the parking assistance control is already executed at time t11, and the target speed TS1 is constant after the time t11.

At this time, when the wheel 3 of the vehicle 1 comes into contact with the step 90 (FIG. 6A), the actual speed AS1 of the vehicle 1 decreases from time t12 and becomes 0 at time t13. Thereafter, the actual speed AS1 of the vehicle 1 is 0 until time t14, and when the vehicle 1 starts going over the step 90 from time t14 (FIG. 6B), the actual speed AS1 increases to reach the target speed TS1 at time t15.

However, because the integrated value is large at the time t15, if the vehicle 1 goes over the step 90 in that state (FIG. 6C), torque rapidly decreases, so that a required braking force increases due to a large integrated value and the ride comfort of the vehicle deteriorates. That is, the actual speed AS1 of the vehicle 1 greatly increases from the time t15 and then decreases, and then becomes the same speed as the target speed TS1 at the time t16. The target acceleration TA1 changes as illustrated in FIG. 7B.

Therefore, for example, in a case where the integrated value is equal to or larger than a predetermined threshold when the value of the target acceleration changes from positive to negative, the acceleration FB control unit 143 determines that the vehicle 1 has gone over the step (hereinafter, also referred to as a step determining method 1). That is, as illustrated in FIG. 7B, a condition is satisfied that the value of the target acceleration TA1 changes from positive to negative at the time t15, which is about a timing when the vehicle 1 has gone over the step, and the integrated value is equal to or larger than the predetermined threshold at that time. Therefore, when this condition is satisfied, the acceleration FB control unit 143 determines that the vehicle 1 has gone over the step, and resets the integrated value to 0. Then, each parameter transitions as illustrated in FIGS. 8A and 8B.

Figures 8A, 8B:
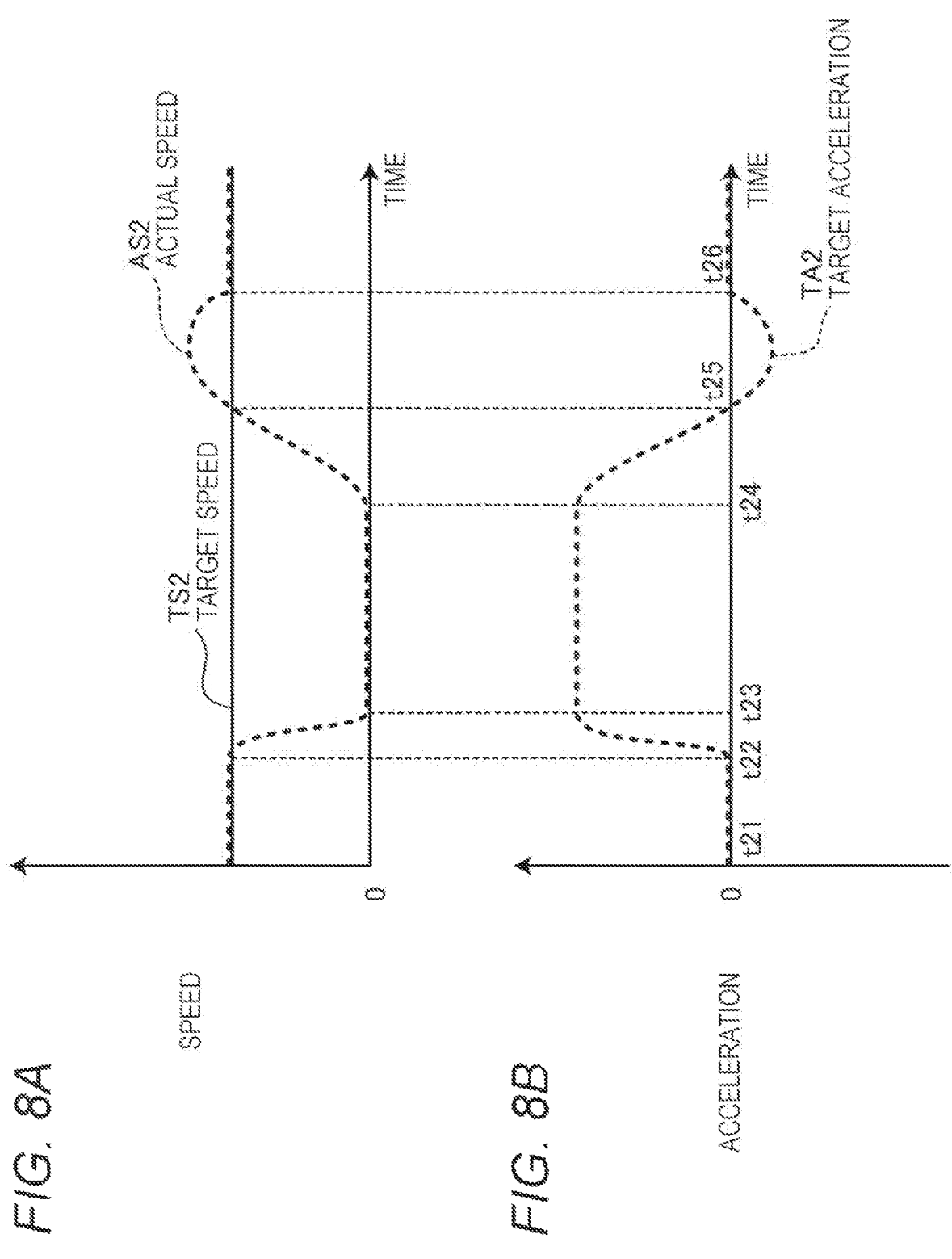
FIGS. 8A and 8B are graphs illustrating an example of a temporal change of each parameter in the embodiment.

FIGS. 8A and 8B are graphs each illustrating an example of a temporal change of each parameter in the embodiment. FIG. 8A is a graph of speed, and FIG. 8B is a graph of acceleration. In the parking assistance in embodiment, the parking assistance control is already executed at time t21, and the target speed TS2 is constant after the time t21.

At this time, when the wheel 3 of the vehicle 1 comes into contact with the step 90 (FIG. 6A), the actual speed AS2 of the vehicle 1 decreases from time t22 and becomes 0 at time t23. Thereafter, the actual speed AS2 of the vehicle 1 is 0 until time t24, and when the vehicle 1 starts going over the step 90 from time t24 (FIG. 6B), the actual speed AS2 increases to reach the target speed TS1 at time t25.

Then, although the integrated value is large at the time t25, the acceleration FB control unit 143 resets the integrated value to 0. Thereafter, when the vehicle 1 goes over the step 90 (FIG. 6C), the torque rapidly decreases, but since the integrated value is reset to 0, the required braking force does not increase so much, and deterioration of the ride comfort of the vehicle 1 can be suppressed. That is, the actual speed AS1 of the vehicle 1 greatly increases from the time t25 and then decreases, and then becomes the same speed as the target speed TS2 at the time t26. At that time, the target acceleration TA2 changes as illustrated in FIG. 8B. That is, as compared with the target acceleration TA1 in FIG. 7B, the target acceleration TA2 does not become so small after the time t25.

In addition to the step determining method 1 described above, the determination that the vehicle 1 has gone over the step may be made, for example, as follows. That is, the acceleration FB control unit 143 determines that the vehicle 1 has gone over the step when both of the following conditions 1 and 2 are satisfied (hereinafter, also referred to as a step determining method 2).

(Condition 1) The duration of a state in which the traveling vehicle 1 stops and the value of the target acceleration is positive exceeds a predetermined step determination ON time (for example, about several hundred milliseconds).

(Condition 2) The duration of a state in which the vehicle 1 is traveling exceeds a predetermined step determination OFF time (for example, about several hundred milliseconds) after the condition 1 is satisfied.

Figures 6A, 6B, 6C:
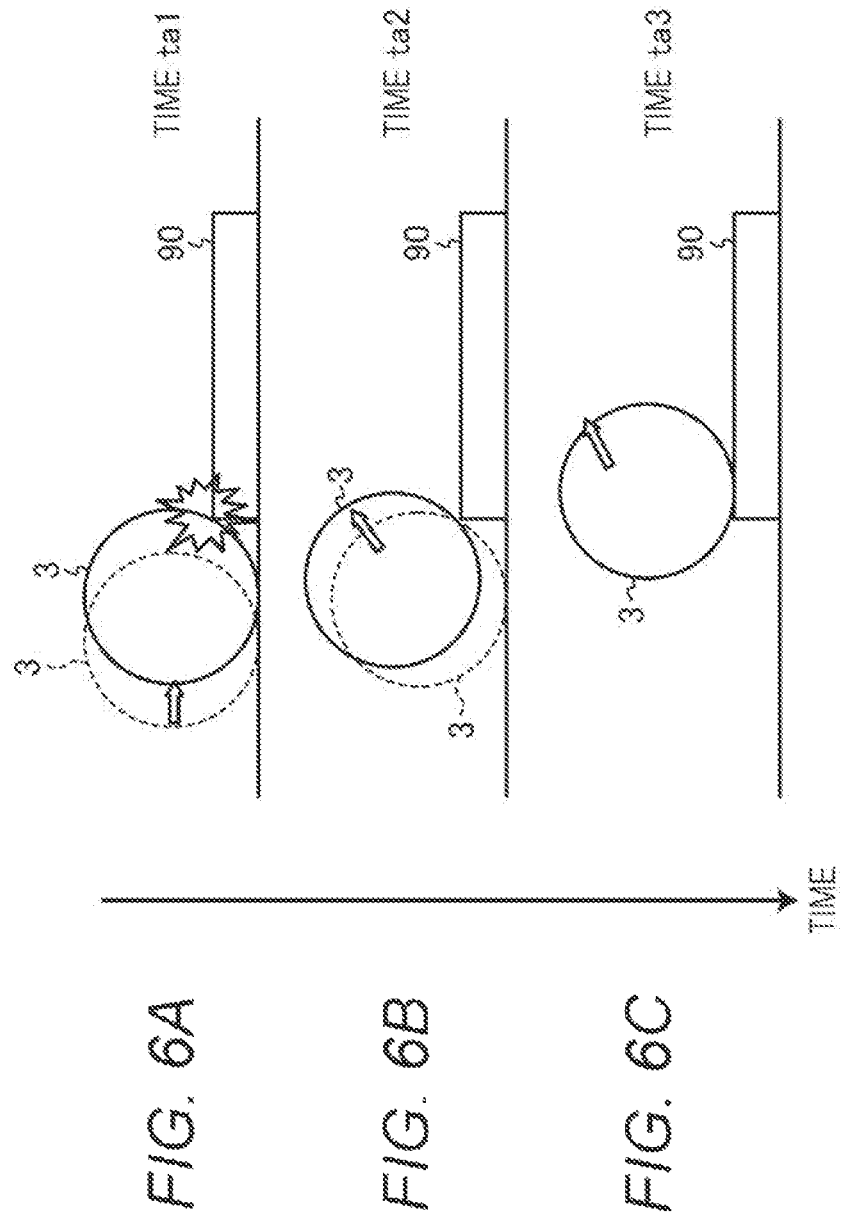
FIGS. 6A to 6C are explanatory diagrams regarding determination of whether the vehicle has gone over a step in the embodiment.

First, the condition 1 is a condition satisfied in a case illustrated in FIG. 6A. Then, the condition 2 is a condition satisfied in a case illustrated in FIG. 6C. Therefore, when both of the conditions 1 and 2 are satisfied, the acceleration FB control unit 143 determines that the vehicle 1 has gone over the step, and resets the integrated value of the deviation between the target acceleration and the actual acceleration to 0.

In addition, the acceleration FB control unit 143 may use both the step determining method 1 and the step determining method 2 and when at least one thereof is satisfied, may determine that the vehicle 1 has gone over the step and reset the integrated value of the deviation between the target acceleration and the actual acceleration to 0. This makes it possible to more reliably and quickly determine that the vehicle 1 has gone over the step.

Returning to FIG. 5, the vehicle control unit 144 controls a braking and driving force of the vehicle 1 by outputting an instruction signal to a braking and driving force device 300 (engine, brake system 18, and the like) based on the required braking and driving force.

Figure 9:
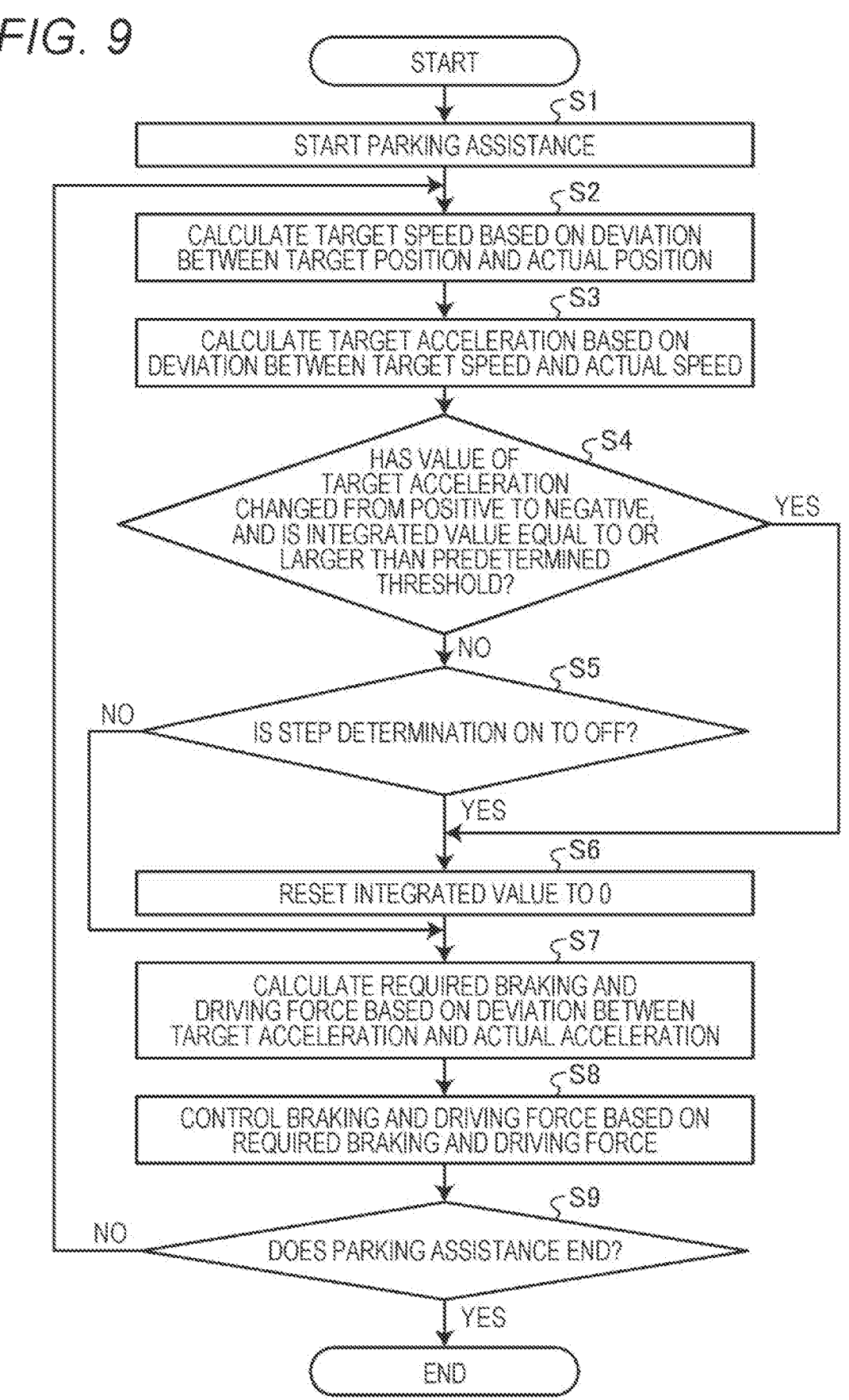
FIG. 9 is a flowchart illustrating processing by the ECU according to the embodiment.

Next, processing by the ECU 14 according to the embodiment will be described with reference to FIG. 9. FIG. 9 is a flowchart illustrating processing by the ECU 14 according to the embodiment. Note that, during this processing, the ECU 14 calculates and acquires various kinds of information such as a target position, an actual position, an actual speed, and an actual acceleration of the vehicle 1, as appropriate.

In step S1, the ECU 14 starts parking assistance in response to the operation by the driver.

In step S2, the position FB control unit 141 calculates, based on deviation between a target parking position and an actual position of the vehicle 1, a target speed.

In step S3, the speed FB control unit 142 calculates, based on deviation between a target speed and an actual speed of the vehicle 1, a target acceleration.

Next, in step S4, the acceleration FB control unit 143 determines whether a condition that the value of the target acceleration has changed from positive to negative and the integrated value is equal to or larger than a predetermined threshold value at that time (condition of the step determining method 1) is satisfied. If Yes, the processing proceeds to step S6, and if No, the processing proceeds to step S5.

In step S5, the acceleration FB control unit 143 determines whether both of the conditions 1 and 2 (step determination on to off) of the step determining method 2 are satisfied. If Yes, the processing proceeds to step S6, and if No, the processing proceeds to step S7.

In step S6, the acceleration FB control unit 143 resets the integrated value of the deviation between the target acceleration and the actual acceleration to 0.

In step S7, the acceleration FB control unit 143 calculates, based on the deviation between the target acceleration and the actual acceleration of the vehicle 1, a required braking and driving force by the FB control including the integration term.

In step S8, the vehicle control unit 144 controls the braking and driving force of the vehicle 1 by outputting an instruction signal to the braking and driving force device 300 based on the required braking and driving force.

In step S9, the ECU14 determines whether the parking assistance ends. If Yes, the processing ends, and if No, the processing returns to step S2.

As described above, according to the ECU 14 of the present embodiment, when it is determined that the vehicle 1 has gone over the step, the integrated value of the deviation between the target acceleration and the actual acceleration is reset to 0, so that it is possible to suppress deterioration of ride comfort when the vehicle 1 goes over the step. Note that the suppression here is not limited to being set to 0, but means being reduced as compared with the case of the prior art.

Specifically, for example, in a case where the integrated value is equal to or larger than a predetermined threshold when the value of the target acceleration changes from positive to negative (that is, when the condition of the step determining method 1 is satisfied), it is determined that the vehicle 1 has gone over the step, and the integrated value is reset to 0, so that it is possible to suppress deterioration of ride comfort when the vehicle 1 goes over the step.

Moreover, specifically, for example, it is determined that the vehicle 1 has gone over the step with the step determining method 2 using the step determination ON time and the step determination OFF time, and the integrated value is reset to 0, so that it is possible to suppress deterioration of ride comfort when the vehicle 1 goes over the step.

Furthermore, by using the step determining method 1 and the step determining method 2 in combination, it is possible to more reliably and quickly determine that the vehicle 1 has gone over the step.

Note that the program executed by the vehicle 1 may be provided as a computer program product by being stored in a computer-readable storage medium such as a CD-ROM, a CD-R, a memory card, a digital versatile disk (DVD), and a flexible disk (FD) as a file in an installable format or an executable format. Furthermore, the program may be provided by being stored on a computer connected to a network such as the Internet and downloaded via the network. Furthermore, the program may be provided or distributed via a network such as the Internet.

A parking assistance device includes: a target acceleration calculation unit that calculates a target acceleration for moving a vehicle subjected to assistance to a target parking position of the vehicle subjected to assistance; an acceleration feedback control unit that calculates a required braking and driving force based on a deviation between the target acceleration of the vehicle subjected to assistance and an actual acceleration by feedback control including an integration term, determines whether the vehicle subjected to assistance has gone over a step, and resets an integrated value of the deviation between the target acceleration and the actual acceleration to 0 when it is determined that the vehicle subjected to assistance has gone over the step; and a vehicle control unit that controls the braking and driving force of the vehicle subjected to assistance based on the required braking and driving force.

With this configuration, when it is determined that the vehicle subjected to assistance has gone over the step, the integrated value of the deviation between the target acceleration and the actual acceleration is reset to 0, so that it is possible to suppress deterioration of ride comfort when the vehicle goes over the step.

Furthermore, in the parking assistance device, the acceleration feedback control unit determines that the vehicle subjected to assistance has gotten over the step in a case where the integrated value is equal to or larger than a predetermined threshold when the value of the target acceleration changes from positive to negative, and resets the integrated value of the deviation between the target acceleration and the actual acceleration to 0.

With this configuration, specifically, in a case where the integrated value is equal to or larger than a predetermined threshold when the value of the target acceleration changes from positive to negative, it is determined that the vehicle subjected to assistance has gone over the step, and the integrated value is reset to 0, so that it is possible to suppress deterioration of ride comfort when the vehicle subjected to assistance goes over the step.

Furthermore, in the parking assistance device, the acceleration feedback control unit determines that the vehicle subjected to assistance has gone over the step when a duration of a state in which the vehicle subjected to assistance that has been traveling is stopped and a value of the target acceleration is positive exceeds a predetermined step determination ON time, and then the duration of the state in which the vehicle subjected to assistance is traveling exceeds a predetermined step determination OFF time, and resets the integrated value of the deviation between the target acceleration and the actual acceleration to 0.

With this configuration, specifically, it is determined that the vehicle subjected to assistance has gone over the step with the step determining method described above using the step determination ON time and the step determination OFF time, and the integrated value is reset to 0, so that it is possible to suppress deterioration of ride comfort when the vehicle subjected to assistance goes over the step.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assistance device comprising:
a target acceleration calculator that calculates a target acceleration for moving a vehicle subjected to assistance to a target parking position of the vehicle subjected to assistance;
an acceleration feedback controller that calculates a required braking and driving force based on a deviation between the target acceleration of the vehicle subjected to assistance and an actual acceleration by feedback control including an integration term, determines whether the vehicle subjected to assistance has gone over a step, and resets an integrated value of the deviation between the target acceleration and the actual acceleration to 0 when it is determined that the vehicle subjected to assistance has gone over the step; and
a vehicle controller that controls the braking and driving force of the vehicle subjected to assistance based on the required braking and driving force.

2. A parking assistance device comprising:
a target acceleration calculator that calculates a target acceleration for moving a vehicle subjected to assistance to a target parking position of the vehicle subjected to assistance;
an acceleration feedback controller that calculates a required braking and driving force based on a deviation between the target acceleration of the vehicle subjected to assistance and an actual acceleration by feedback control including an integration term, determines whether the vehicle subjected to assistance has gone over a step, and resets an integrated value of the deviation between the target acceleration and the actual acceleration to 0 when it is determined that the vehicle subjected to assistance has gone over the step; and a vehicle controller that controls the braking and driving force of the vehicle subjected to assistance based on the required braking and driving force, wherein the acceleration feedback controller determines that the vehicle subjected to assistance has gone over the step in a case where the integrated value is equal to or larger than a predetermined threshold when the value of the target acceleration changes from positive to negative, and resets the integrated value of the deviation between the target acceleration and the actual acceleration to 0.

3. A parking assistance device comprising:

a target acceleration calculator that calculates a target acceleration for moving a vehicle subjected to assistance to a target parking position of the vehicle subjected to assistance;

an acceleration feedback controller that calculates a required braking and driving force based on a deviation between the target acceleration of the vehicle subjected to assistance and an actual acceleration by feedback control including an integration term, determines whether the vehicle subjected to assistance has gone over a step, and resets an integrated value of the deviation between the target acceleration and the actual acceleration to 0 when it is determined that the vehicle subjected to assistance has gone over the step; and a vehicle controller that controls the braking and driving force of the vehicle subjected to assistance based on the required braking and driving force, wherein the acceleration feedback controller determines that the vehicle subjected to assistance has gone over the step when a duration of a state in which the vehicle subjected to assistance that has been traveling is stopped and a value of the target acceleration is positive exceeds a predetermined step determination ON time, and then the duration of the state in which the vehicle subjected to assistance is traveling exceeds a predetermined step determination OFF time, and resets the integrated value of the deviation between the target acceleration and the actual acceleration to 0.

* * * * *